United States Patent
Alland et al.

(10) Patent No.: US 7,639,171 B2
(45) Date of Patent: Dec. 29, 2009

(54) RADAR SYSTEM AND METHOD OF DIGITAL BEAMFORMING

(75) Inventors: Stephen W. Alland, Newbury Park, CA (US); James F. Searcy, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 111 days.

(21) Appl. No.: 12/072,794

(22) Filed: Feb. 28, 2008

(65) Prior Publication Data

US 2009/0085800 A1 Apr. 2, 2009

Related U.S. Application Data

(60) Provisional application No. 60/995,549, filed on Sep. 27, 2007.

(51) Int. Cl.
*G01S 13/00* (2006.01)

(52) U.S. Cl. .................. 342/25 R; 342/84; 342/171; 342/25 F

(58) Field of Classification Search ............... 342/25 R
See application file for complete search history.

(56) References Cited

U.S. PATENT DOCUMENTS

| | | | |
|---|---|---|---|
| 3,276,019 A | 9/1966 | Fackler | |
| 3,803,625 A | 4/1974 | Nemit | |
| 3,833,904 A | 9/1974 | Gebhardt | |
| 3,858,206 A | 12/1974 | Scheidler et al. | |
| 4,041,501 A | 8/1977 | Frazita et al. | |
| 4,103,302 A | 7/1978 | Roeder et al. | |
| 4,423,420 A | 12/1983 | Krajewski | |
| 4,431,995 A | 2/1984 | Barton et al. | |
| 4,652,880 A | 3/1987 | Moeller et al. | |
| 4,962,381 A | 10/1990 | Helbig, Sr. | |
| 5,103,233 A | 4/1992 | Gallagher et al. | |
| 5,307,073 A | 4/1994 | Riza | |
| 5,657,026 A | 8/1997 | Culpepper et al. | |
| 5,959,571 A * | 9/1999 | Aoyagi et al. | 342/70 |
| 6,018,317 A | 1/2000 | Dogan et al. | |
| 6,285,312 B1 | 9/2001 | Thomassen | |
| 6,559,797 B1 | 5/2003 | Chang | |
| 6,590,532 B1 | 7/2003 | Ogawa et al. | |
| 6,661,376 B2 | 12/2003 | Maceo et al. | |
| 6,823,170 B1 | 11/2004 | Dent | |
| 6,859,168 B2 | 2/2005 | Isaji | |
| 6,999,724 B2 | 2/2006 | Chizhik | |

(Continued)

*Primary Examiner*—Thomas H Tarcza
*Assistant Examiner*—Timothy A Brainard
(74) *Attorney, Agent, or Firm*—Douglas D. Fekete

(57) ABSTRACT

A radar system and method is provided, in which the radar system includes a first transmitting portion of antenna elements, a second transmitting portion of antenna elements, and a receiving portion of antenna elements, such that the receiving antenna elements form a plurality of subarrays that represent real and synthetic antenna elements. The radar system further includes a transceiving device having a switching matrix. At least first and second switching transmit antenna elements are configured and time-multiplexed, wherein a receive aperture of the receiving antenna elements is increased. A first signal transmitted is received by the real antenna elements and a second signal transmitted is received by the real antenna elements, and combined so that the signals received from the first switching transmit antenna element represents a signal received by the real receive antenna element, and the signal received from the second switching transmit antenna element represents a signal received by the synthetic receive antenna element.

20 Claims, 5 Drawing Sheets

U.S. PATENT DOCUMENTS

| | | |
|---|---|---|
| 7,167,139 B2 | 1/2007 | Kim et al. |
| 2002/0012289 A1 | 1/2002 | Gilbert et al. |
| 2003/0095067 A1 | 5/2003 | Howell |
| 2004/0164892 A1* | 8/2004 | Shinoda et al. ............. 342/107 |
| 2005/0018540 A1 | 1/2005 | Gilbert et al. |
| 2006/0244656 A1 | 11/2006 | Lawrence et al. |
| 2007/0001897 A1 | 1/2007 | Alland |
| 2007/0052581 A1* | 3/2007 | Shima ........................ 342/173 |
| 2008/0100510 A1* | 5/2008 | Bonthron et al. ............ 342/373 |

* cited by examiner

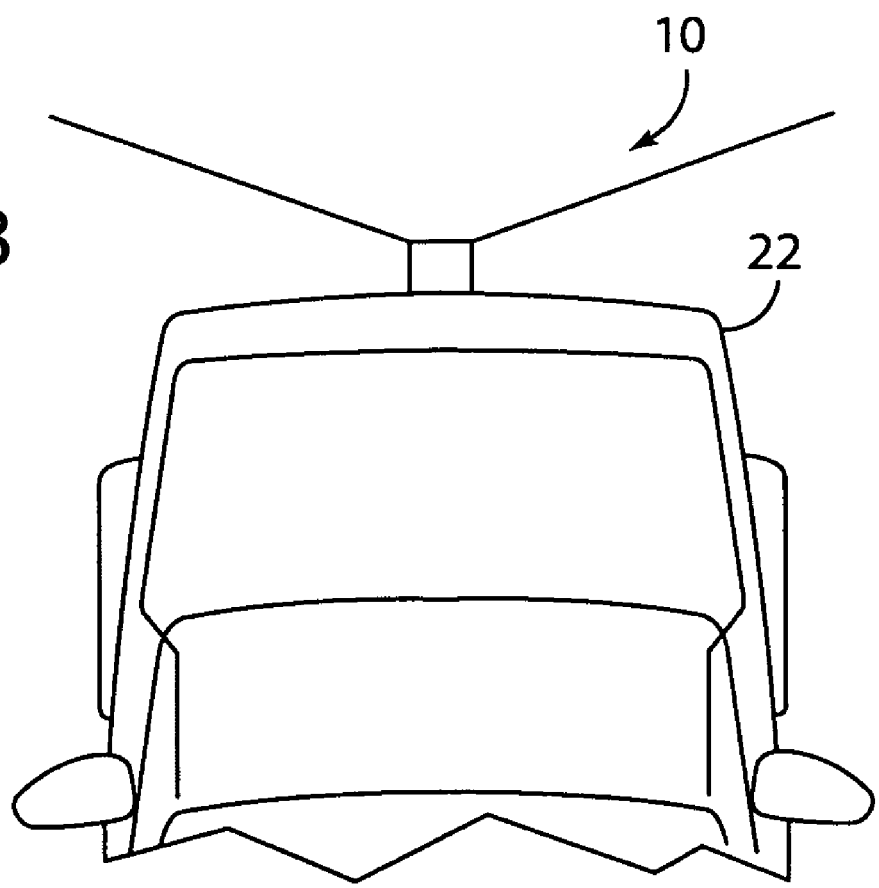

RADAR SYSTEM AND METHOD OF DIGITAL BEAMFORMING

CROSS-REFERENCE TO RELATED APPLICATION

This application claims the benefit under 35 U.S.C. §119(e) of U.S. Provisional Patent Application No. 60/995,549, filed on Sep. 27, 2007, the entire disclosure of which is hereby incorporated herein by reference.

TECHNICAL FIELD

The present invention generally relates to a radar system and method of operating thereof, and more particularly, to a radar system including a method of digital beamforming and detecting targets.

BACKGROUND OF THE DISCLOSURE

Generally, some known radar systems achieve angle coverage with multiple signal beams, depending upon the application with which the radar system is used. In such radar systems, a switched beam or mechanically scanned antenna can be incorporated, which can limit performance in one or more ways. One example of such a conventional radar system generally having limited performance is a mechanically scanned antenna that has an update rate that is too slow to achieve wide angle coverage for a particular application. Switched beam radar systems can achieve high update rate, but the number of beams is often limited, resulting in either angle coverage that is too narrow or a beamwidth that is too wide for particular applications.

Electronically scanned antennas can generally be employed with radar systems. A radar system having an antenna that electronically scans can generally allow for fast scanning, the ability to host multiple antenna beams on the same array, a wide field of view, a narrow beam, and a high update rate. However, electronically scanned antennas typically use discrete phase shifters that are expensive and can introduce excessive radio frequency (RF) loss at particular frequencies, such as 24 GHz and 76 GHz, for example, in automotive radar systems.

In addition to the excessive RF loss at particular frequencies, using discrete phase shifters can be undesirable in an automotive application due to the cost of such a radar system. Other examples of deficiencies of radar systems used in automobile applications are a limited field of view, an insufficient update rate, inaccuracy, lack of multi-target discrimination, lack of stopped object capability, and inadequate false alarm rates.

SUMMARY OF THE INVENTION

According to one aspect of the present invention, a radar system includes a plurality of antenna elements, wherein the plurality of antenna elements include a first transmitting portion of antenna elements, a second transmitting portion of antenna elements, and a receiving portion of antenna elements, such that the receiving antenna elements form a plurality of subarrays that represent real and synthetic receive antenna elements. The radar system also includes a transceiving device in communication with the receiving portion of antenna elements that receives at least a portion of the plurality of signals transmitted by the transmitting portion of antenna elements including a switching matrix, wherein the switching matrix time-multiplexes the receiving portion of antenna elements. At least the first and second switching transmit antenna elements are configured and time-multiplexed with respect to the receiving portion of the antenna elements, wherein a receive aperture of the receiving portion of the antenna elements is increased. Thus, a first signal transmitted by the first switching transmit antenna element is received by at least one real antenna element and the second signal transmitted by a second switching transmit antenna element is received by at least one real antenna element, wherein the received signals are combined so that the signal received from the first switching transmit antenna element represents a signal received by the real receive antenna element, and the signal received from the second switching transmit antenna element represents a signal received by the synthetic receive antenna element.

According to another aspect of the present invention, a method of electronically scanning a radar signal is provided. The method includes the steps of transmitting a plurality of signals by a plurality of switching transmit antenna elements, such that a first switching transmit antenna element of the plurality of switching transmit antenna elements transmits a first signal, and switching between the plurality of switching transmit antenna elements, such that a second switching transmit antenna element of the plurality of switching transmit antenna elements transmits a second signal. The method further includes the steps of receiving at least a portion of the transmitted plurality of signals by a transceiving device including a plurality of receiving antenna elements, and time-multiplexing the received signals. Thus, the first transmitted signal is received by at least one real antenna element of the plurality of receiving antenna elements and the second transmitted signal is received by at least one real antenna element of the plurality of receiving antenna elements, wherein, by combining the received signals, a receiving aperture of the receiving portion of the antenna elements is increased, such that the signal received from the first switching transmit antenna represents a signal received by the real receive antenna element, and the signal received from the second switching transmit antenna represents a signal received by the synthetic receive antenna element.

These and other features, advantages, and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which:

FIG. 8 is a top plan view of a radar system used with a vehicle, in accordance with one embodiment of the present invention.

DESCRIPTION OF PREFERRED EMBODIMENTS

Figure 1:
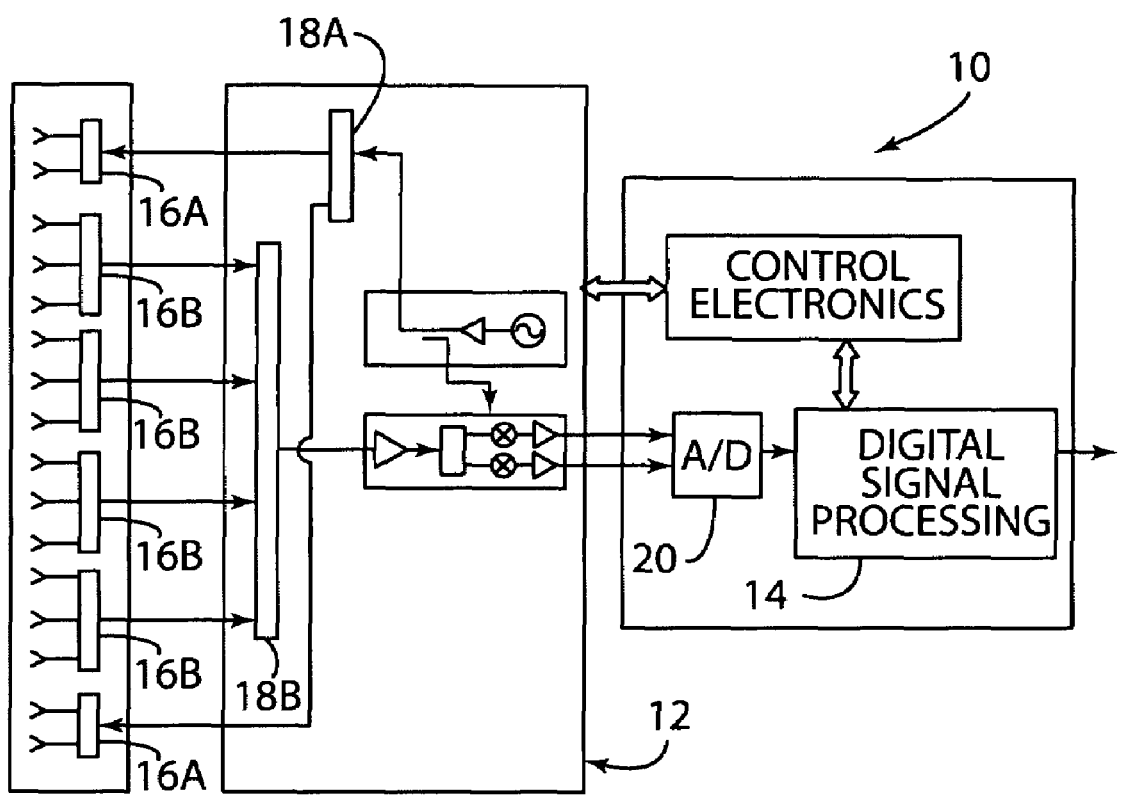
FIG. 1 is a block diagram of a radar system, in accordance with one embodiment of the present invention.

In reference to FIG. 1, a radar system is generally shown at reference identifier 10. The radar system 10 includes a transceiving device generally indicated at 12, a processor 14, and a plurality of antenna elements 16. Thus, the radar system 10 is an electronically scanned radar system with digital beamforming, according to one embodiment. An exemplary electronically scanned radar system with digital beamforming is disclosed in U.S. Patent Application Publication No. 2007/0001897 A1, entitled "DIGITAL BEAMFORMING FOR AN ELECTRONICALLY SCANNED RADAR SYSTEM", which is hereby incorporated herein by reference.

According to one embodiment, the plurality of antenna elements include a transmitting portion of antenna elements 16A and a receiving portion of antenna elements 16B, such that the receiving portion of antenna elements form a plurality of subarrays that, when the received signals are combined in the processor 14, represent real and synthetic antenna elements. The transceiving device 12 is in communication with the receiving antenna elements 16B that receive at least a portion of a plurality of signals transmitted by the transmitting elements 16A. Thus, the transceiving device 12 is in communication with the transmitting antenna elements 16A and the receiving antenna elements 16B, such that the transceiving device 12 transmits a signal from the transmitting antenna elements 16A, and the transmitted signal propagates in space, reflects off of an object, and is received by the transceiving device 12 through the receiving antenna elements 16B.

According to one embodiment, the transceiving device 12 is a single transceiver that transmits and receives signals. According to an alternate embodiment, the transceiving device 12 includes a receiver and a transmitter. According to one embodiment, the transmitting antenna elements 16A are in communication with a switch matrix, wherein a first switch matrix 18A time-multiplexes the transmitting antenna elements 16A, and a second switch matrix 18B time-multiplexes the receiving antenna elements 16B. According to one embodiment, the transceiving device 12 includes the switch matrix. Alternatively, the switch matrix can be separate from the transceiving device 12. It should be appreciated by those skilled in the art that the switching matrix can be a single device, including both the first switch matrix 18A and the second switch matrix 18B, or the first and second switch matrices 18A, 18B can be separate devices.

The processor 14 is in communication with the transceiving device 12, wherein the processor 14 digitally beam forms and scans the signals received by the receiving antenna elements 16B. The switching transmit antenna elements 16A include first and second switching transmit antenna elements configured and time-multiplexed with respect to the receiving antenna elements 16B, according to one embodiment. A receive aperture of the receiving antenna elements 16B increases, such that a first signal transmitted by the first switching transmit antenna element is received by a real antenna element and a second signal transmitted by a second switching transmit antenna element is received by a real antenna element, and the processor 14 combines the received signals, such that the signal received from the first switching transmit antenna represents a signal received by the real receive antenna element and the signal received from the second switching transmit antenna represents a signal received by the synthetic receive antenna element, as described in greater detail herein.

According to one embodiment, digital beamforming uses separate transmit and receive antenna elements 16A, 16B, wherein the receiving antenna elements 16B are partitioned or separated into a number of subarrays. According to one embodiment, real receive elements are formed by the real receive elements 16B as the first switching transmit antenna of 16A is activated and synthetic receive elements are formed by the real receiving antenna elements 16B as the second switching transmit antenna of 16A is activated, such that the synthetic receive elements are displaced from the real receive elements with respect to the separation of the signals transmitted by the first and second switched transmit antenna elements. Typically, the two switching transmitting antenna elements 16A are configured and time-multiplexed in relation to the receive elements 16B to effectively double the receive aperture of the receiving antenna elements 16B by a form of synthetic aperture processing in the processor 14. Digital beamforming of the signal transmitted from the transmitting portion of antenna elements 16A can use data from the signal received by the real receive element and the signal received by the synthetic receive element to produce a receive element gain and a beamwidth corresponding to the composite real receive element in addition to the synthetic receive element. Thus, a higher gain, narrow receive beam for improved angle accuracy and discrimination is obtained.

Figure 2:
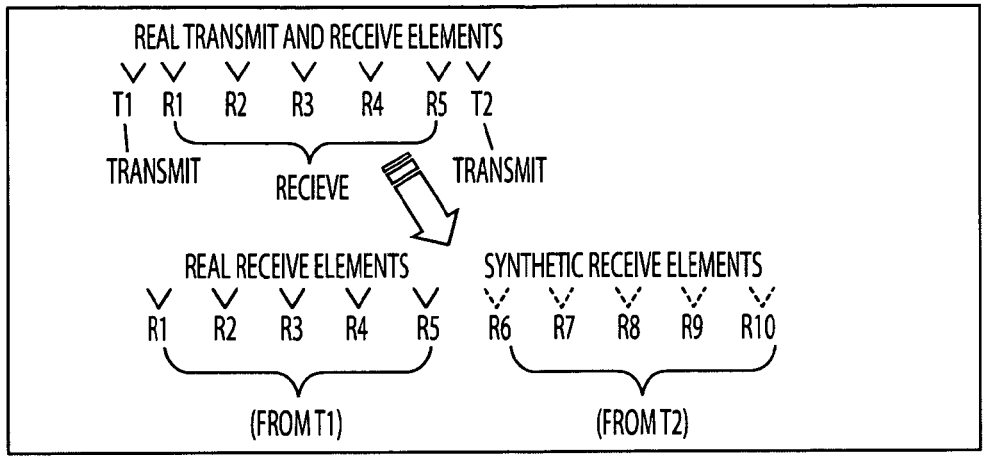
FIG. 2 is a chart illustrating an exemplary configuration of the switching transmitting antenna elements and receiving antenna elements, including real and synthetic receiving elements, in accordance with one embodiment of the present invention.

With regards to both FIGS. 1 and 2, two of the switching transmit antenna elements 16A are represented in FIG. 2 as reference identifiers T1, T2. According to one embodiment, the first transmit antenna T1 is first selected, and signals are received on the real receiving antenna elements, which are represented in FIG. 2 by reference identifiers R1-R5. Then, the second transmit antenna T2 is selected, such that signals are received by the real receiving antenna elements R1-R5. The synthetic receiving antenna elements are represented in FIG. 2 as R6-R10. Thus, the real receiving antenna elements 16B form both the real receive array R1-R5 and the synthetic receive array R6-R10, according to one embodiment. The second transmit-receive operation forms a synthetic receive array displaced from the real receive array by a distance determined by the separation of the signals transmitted by the transmit antennas T1, T2, according to one embodiment. Thus, the real receive antenna elements and synthetic receive antenna elements are the same physical receive antenna elements 16B, and the real receive array is formed by receiving the first transmitted signal and the synthetic receive array is formed by receiving the second transmitted signal, which is transmitted after the first transmitted signal, according to one embodiment. Digital beamforming using data from the real and synthetic receive elements produces receive antenna gain and a beamwidth consistent with a total composite aperture dimension (i.e., real plus synthetic).

Figure 3:
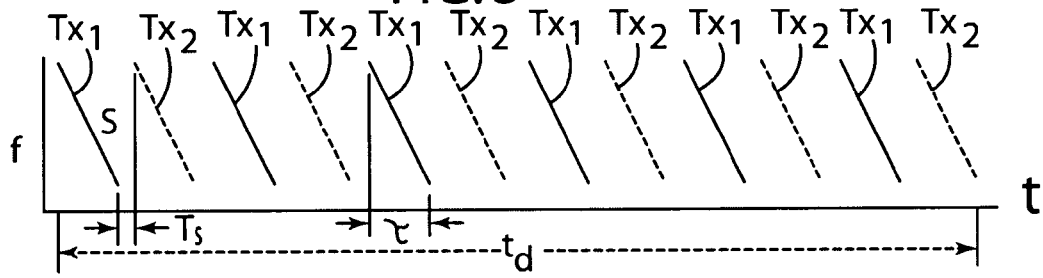
FIG. 3 is a signal diagram illustrating an exemplary interleaved simultaneous transmit and receive pulse Doppler (STAR-PD) signal waveform, in accordance with one embodiment of the present invention.

The transmitted signals that are transmitted by the switched transmitting antenna elements 16A can be a frequency modulated waveform, according to one embodiment. By way of explanation and not limitation, the transmitted signals that are a frequency modulated waveform are simultaneously transmit and receive pulse Doppler (STAR-PD) signals. An example of a STAR-PD signal waveform is shown in FIG. 3. According to one embodiment, a first interleaved STAR-PD signal ($Tx_1$) is transmitted by the first switch antenna element 16A and a substantially identical interleaved STAR-PD signal ($Tx_2$) is transmitted by the second switch transmit antenna element 16A.

Figure 4:
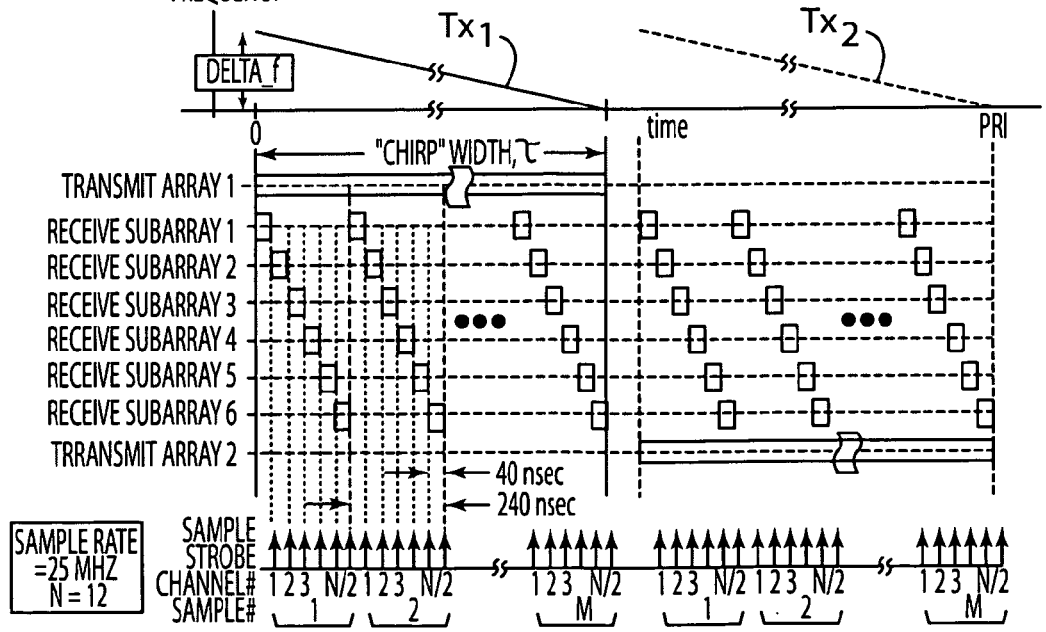
FIG. 4 is a graph illustrating an exemplary transmit-receive time-multiplexing switching and sampling of signals, in accordance with one embodiment of the present invention.

Typically, the STAR-PD signal includes substantially identical linear frequency modulated chirps, as shown in FIG. 3. Generally, the STAR-PD signal is similar to a frequency modulated continuous wave (FMCW) signal; however, the STAR-PD signal transmitted by the transmitting elements 16A has a steeper frequency modulated slope than a typical FMCW signal, and a large number of identical chirps are used in the STAR-PD signal, according to one embodiment. Each chirp of the transmitted STAR-PD signal uses a steep frequency modulated slope, such that a ranging frequency can be much larger than a Doppler frequency component. The STAR-PD waveform allows near one hundred percent (100%) duty factor for maximum detection sensitivity while providing independent range and Doppler measurements with adequate false alarm rates. Typically, the radar system 10 time-multiplexes the transmitting antenna elements and the receiving antenna subarrays in relation to the STAR-PD waveform and samples the received signals, as indicated in FIG. 4.

With regards to FIGS. 1-4, the processor 14 is illustrated in an exemplary embodiment as a digital signal processor (DSP) that processes the received signal, such as the STAR-PD signal, so that each of at least a portion of the chirps of the STAR-PD signal is transformed into range bins for each chirp via a first fast Fourier transform (FFT) process. Then, at least a portion of the range bins are transformed into Doppler bins via a second FFT process by, for a given range bin, using the signals for that range bin from each of the chirps. The transformation of the STAR-PD signals to range and Doppler bins is performed for each receive antenna. The processor 14 then non-coherently integrates (i.e., sums the amplitude of) the range-Doppler bins across each receive antenna, such that only those bins with detections are transformed into angle bins. Alternatively, the digital beam forming FFT can be used to coherently integrate the range-Doppler bins across each receive antenna to transform all bins into angle bins prior to detection. However, using a digital beam forming FFT on all range-Doppler bins can include a greater amount of processing performed by the processor 14 when compared to the process described above.

According to an alternate embodiment, the STAR-PD signal can be transformed into range bins, Doppler bins, and angle bins using a discrete Fourier transform (DFT) instead of the FFT for any or all of the individual transformations. However, using a DFT typically includes a greater amount of processing performed by the processor 14 when compared to the FFT process described above.

The sampling interval with respect to a round-trip propagation delay for the transmitted and received signals based upon the maximum range of interest, can be dependent upon the STAR-PD waveform parameters, according to one embodiment. Thus, the transmit antennas typically are not switched during a chirp without compromising the duty factor, the beamforming capability, or a combination thereof. By transmitting two substantially identical interleaved STAR-PD waveforms for each transmitting antenna element, the synthetic aperture improvement can be obtained without significantly compromising the duty factor. According to an alternate embodiment, non-interleaved, sequential signals can be transmitted from the transmitting antenna elements. However, transmitting such a non-interleaved, sequential signal can reduce Doppler resolution and accuracy, and degrade beamforming capabilities, when compared to transmitting two substantially identical interleaved signals.

Figure 5:
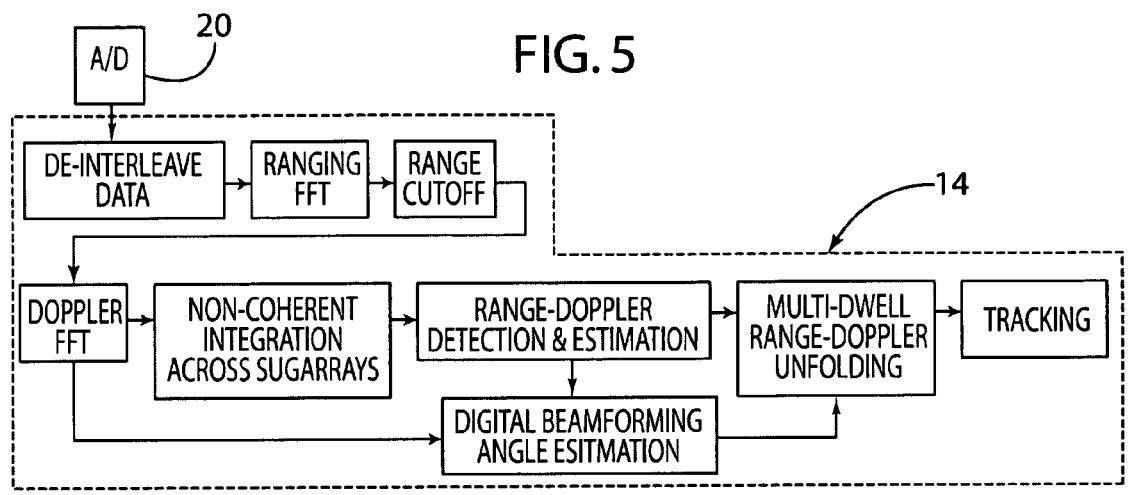
FIG. 5 is a flow chart illustrating a signal processing algorithm and at least a portion of electronic components of a radar system, including a processor, in accordance with one embodiment of the present invention.

In reference to FIG. 5, the processor 14 can include one or more electronic components, one or more software routines, or a combination thereof, to process the signals received from the receiving antenna elements 16B. According to one embodiment, the signals received by the receiving antenna elements 16B are communicated from the transceiving device 12 to an analog-to-digital (A/D) converter 20. The output from the A/D converter 20 is communicated to the processor 14. The processor 14 includes a de-interleaving function that produces sequential data vectors for each of the chirps for each of the antenna subarrays. An example output of de-interleaving is shown as the input "data cube" in FIG. 6.

Figure 6:
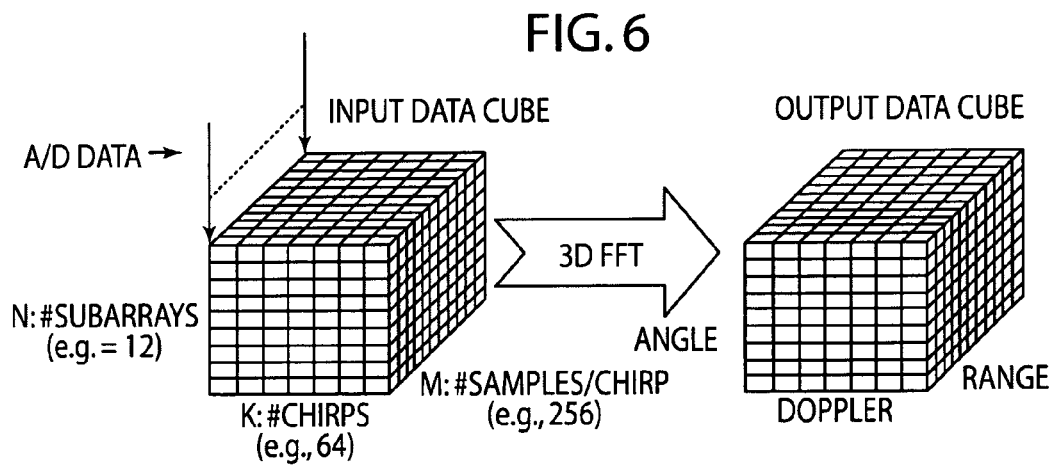
FIG. 6 is an exemplary chart illustrating the de-interleaved A/D data and transformation, in accordance with one embodiment of the present invention.

The processor 14 then forms a ranging FFT, a range cutoff, a Doppler FFT, and a digital beam forming FFT to transform the data from each receive subarray 16B into range-Doppler-angle bins, as illustrated in FIG. 6, according to one embodiment. According to an alternate embodiment, the range-Doppler bins from each subarray are non-coherently integrated for input to the detection process. The digital beamforming FFT can then only be performed on the range-Doppler bins with detections to transform the related data across subarrays into angle bins. Thus, the use of non-coherent integration across the antenna subarrays prior to detection provides sensitivity gain nearly equal to that obtained with beamforming, but with a substantially reduced processing load, thereby allowing the use of a DSP having a minimal cost, according to one embodiment. It should be appreciated by those skilled in the art that without non-coherent integration, radar sensitivity prior to beamforming generally may not be adequate to meet detection range requirements.

Since the composite, time-multiplexed video bandwidth for a predetermined target range is typically greater than the target ranging frequency, the conventional approach of using a low pass filter for range cutoff does not apply. Instead, the processor 14 oversamples the time-multiplexed baseband data by a suitable factor so that the ranging FFT provides range coverage well beyond the maximum range of interest, according to one embodiment.

According to one embodiment, the extra range bins are discarded prior to the Doppler FFT in order to provide an adequate range cutoff. According to an alternate embodiment, the oversampling may increase the A/D converter 20 sample rate and the processing load on the ranging FFT to undesirable levels, and thus, it may be difficult to oversample by an amount sufficient to extend the range cutoff to beyond the maximum detection range for all objects in the environment without putting an undesirable processing load on the processor 14. In this embodiment, the processor 14 uses a combination of oversampling with multi-dwell unfolding. The oversampling is used to set the range cutoff, such that only the largest radar cross-section scatters are detectable beyond the range cutoff, in effect limiting the number and extent of ambiguous interval returns. The multi-dwell unfolding can then be used to reject these returns with adequate false alarm rates, and the processing load of the processor 14 is at an acceptable level.

According to one embodiment, when the transmitted and received signals are STAR-PD waveform signals, the STAR-PD waveform may be ambiguous in Doppler, such that the Doppler interval defined by the chirp spacing may be less than the total required Doppler coverage. Thus, multi-dwell unfolding can be used to unfold the measured target Doppler. By way of explanation and not limitation, in a dense, distributed target environment, the Doppler spread of extended targets is less than their range extents, such that a single set of two dwells with appropriate STAR-PD waveform parameters can be used to both augment range cutoff and perform Doppler unfolding.

Figure 7:
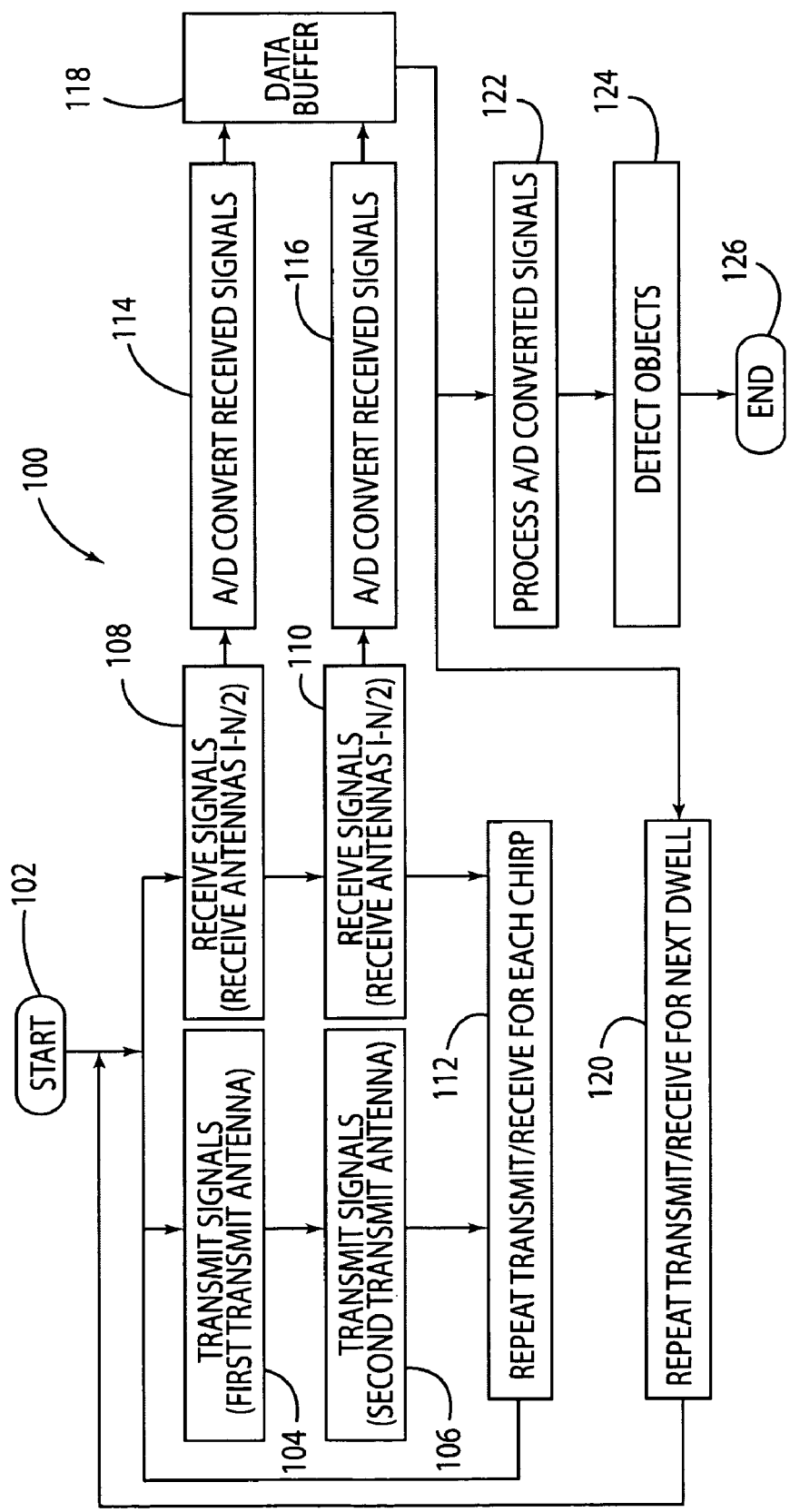
FIG. 7 is a flow chart illustrating a method of operating a radar system, in accordance with one embodiment of the present invention.

With regards to FIG. 7, a method of operating the radar system 10 is generally shown at reference identifier 100. The method 100 starts at step 102, and proceeds to step 104, wherein the signal is transmitted. According to one embodiment, the signal is transmitted by the first transmitting antenna elements 16A. At step 106, a signal is transmitted, wherein the signal is transmitted by the second transmitting antenna elements 16A, and is substantially identical to the signal transmitted in step 104.

At step 108, the signal transmitted at step 104 is received by the receiving antenna elements 16B. At step 110, a signal is received, wherein the received signal is the signal transmitted at step 106. Typically, the signal received at step 110 is received at a later time than the signal received at step 108. This can be a result of having multiple transmit antenna elements 16A. According to one embodiment, at step 112, the transmitting and receiving steps 104, 106, 108, 110 continually repeat for each chirp of a STAR-PD signal.

At step 114, the received signal that is received at step 108 is converted into a digital signal by the A/D converter 20, according to one embodiment. At step 116, the signals received at step 110 are converted to a digital signal by the A/D converter 20, according to one embodiment. The method 100 then proceeds to step 118, wherein the converted digital signals of steps 114, 116 are buffered. According to one embodiment, the transmitting and receiving of signals at steps 104, 106, 108, 110, the A/D converting of the received signals at steps 114, 116, and the buffering of the signals 118 can be repeated for each dwell of the STAR-PD signal at step 120.

At step 122, the converted received signals are processed. Objects are then detected at step 124 based upon the processed signals, and the method ends at step 126. It should be appreciated by those skilled in the art that the above steps can be performed substantially simultaneously, such that signals are continuously being transmitted, received, converted, buffered, and processed to detect objects.

By way of explanation and not limitation, in operation and in reference to FIGS. 1-8, the radar system 10 and method 100 are used with a vehicle 22, as shown in FIG. 8. According to one embodiment, the radar system 10 and method 100 identify objects in the vehicle's 22 path. Thus, the signal is transmitted by the transmitting antenna elements 16A and received by the receiving antenna elements 16B, and the processor 14 processes the signals to detect the objects. According to one embodiment, the radar system 10 is a receive digital beamforming (RDBF), electronic scan automotive radar (ESAR). Therefore, the radar system 10 and method 100 can be used to detect objects proximate the vehicle 22, such that predetermined features of the vehicle 22 can be activated based upon the detection of an object. It should be appreciated by those skilled in the art that the radar system 10 and method 100 can be used on other objects or mobile apparatuses.

Advantageously, the radar system 10 and method 100 have a wide field of view, high update rates, high detection sensitivity, accurate range measurements, Doppler measurements, and angle measurements, multi-target discrimination in range, Doppler and angle, and adequate false alarm rates, wherein the package of the radar system 10 has a reduced size and cost when compared to other types of radar systems. The apparent longer receive aperture of the receiving antenna elements 16A typically creates a narrow beamwidth and increases accuracy with a smaller antenna, as compared to an antenna that does not receive a signal that is processed to represent a real and synthetic antenna array. It should be appreciated by those skilled in the art that the radar system 10 and method 100 can include additional or alternative uses and advantages.

The above description is considered that of preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A radar system comprising:
a plurality of antenna elements comprising:
  a first transmit antenna element;
  a second transmit antenna element; and
  a receiving portion of antenna elements, such that said receiving antenna elements form a plurality of subarrays that represent real and synthetic receive antenna elements;
a transceiving device comprising a switching matrix, wherein said transceiving device is in communication with said transmitting portion of antenna elements and said receiving portion of antenna elements that receives at least a portion of said plurality of signals transmitted by said transmitting portion of antenna elements, and said switching matrix time-multiplexes said transmitting and receiving portion of antenna elements; and
at least said first and second switching transmit antenna elements configured and time-multiplexed with respect to said receiving portion of said antenna elements, such that a first signal transmitted by said first switching transmit antenna element is received by at least one said real antenna element and a second signal transmitted by said second switching transmit antenna element is received by at least one said real antenna element, and wherein said received signals are combined so that said signal received from said first switching transmit antenna element represents a signal received by said real receive antenna element and said signal received from said second switching transmit antenna element represents a signal received by said synthetic receive antenna element, wherein a receive aperture of said receiving portion of antenna elements is increased.

2. The radar system of claim 1 further comprising a processor in communication with said transceiving device, wherein said processor beam forms and scans said signals received by said receiving portion of antenna elements.

3. The radar system of claim 1, wherein said increased receive aperture forms a narrow beamwidth of said signal transmitted by said transmitting portion of antenna elements.

4. The radar system of claim 1, wherein said synthetic antenna elements are displaced from said real antenna elements with respect to a predetermined distance between said signals transmitted by said first and second switched transmit antenna elements.

5. The radar system of claim 1, wherein digital beamforming of said signal transmitted from said transmitting portion of antenna elements using data from said signals received by said real receive elements and said signals received by said synthetic receive elements, produces a receive antenna gain and beamwidth corresponding to said real receive elements in addition to said synthetic receive elements.

6. The radar system of claim 1, wherein said transmitted signals are a simultaneous transmit and receive pulse Doppler (STAR-PD) frequency modulated waveform.

7. The radar system of claim 6, wherein a first interleaved STAR-PD signal is transmitted by said first switching transmit antenna element and a substantially identical interleaved STAR-PD signal is transmitted by said second switching transmit antenna element.

8. The radar system of claim 6, wherein said STAR-PD signal comprises substantially identical linear frequency modulated chirps, and a processor processes said STAR-PD signal, such that each of at least a portion of said chirps is transformed into range bins for each chirp and at least a portion of said range bins are transformed into Doppler bins.

9. The radar system of claim 8, wherein said processor non-coherently integrates said range-Doppler bins and performs detection substantially prior to digital beamforming, such that transformation into angle bins is substantially limited to said range-Doppler bins with detections.

10. The radar system of claim 1, wherein a processor oversamples time-multiplexed baseband data by a predetermined factor for range cutoff of said received signals.

11. The radar system of claim 10, wherein said oversampled time-multiplexed baseband data is combined with multi-dwell unfolding, for range cutoff of said received signals and range-Doppler unfolding.

12. The radar system of claim 1, wherein said transceiving device down-converts and samples said time-interleaved data within a signal received from each said antenna element of said receiving portion of antenna elements.

13. The radar system of claim 1, wherein a processor beam forms and scans said signal by combining sampled data of said signal from each said antenna element of said receiving portion of antenna elements with amplitude and phase weighting.

14. A method of electronically scanning a radar signal, said method comprising the steps of:
  transmitting a plurality of signals by a plurality of switching transmit antenna elements, such that a first switching transmit antenna element of said plurality of switching transmit antenna elements transmits a first signal;
  switching between said plurality of switching transmit antenna elements, such that a second switching transmit antenna element of said plurality of switching transmit antenna elements transmits a second signal;
  receiving at least a portion of said transmitted plurality of signals by a transceiving device comprising a plurality of receiving antenna elements;
  time-multiplexing said received signals, such that said first transmitted signal is received by at least one real antenna element of said plurality of receiving antenna elements and said second transmitted signal is received by at least one real antenna element of said plurality of receiving antenna elements, and combining said received signals, such that the signal received from said first switching transmit antenna element represents a signal received by said real receive antenna element, and the signal received from said second switching transmit antenna element represents a signal received by said synthetic receive antenna element, wherein a receiving aperture of said plurality of receiving antenna elements is increased.

15. The method of claim 14, wherein said increased receive aperture forms a narrow beamwidth of said signal transmitted by said transmitting portion of antenna elements.

16. The method of claim 14, wherein synthetic receive elements are displaced from real receive elements with respect to a predetermined distance between said signals transmitted by said first and second switching transmit antenna elements.

17. The method of claim 14, wherein said step of forming a beam comprises digitally beamforming said signals received by said real receive elements and said signals received by said synthetic receive elements, to produce a receive antenna gain corresponding to said real receive elements in addition to said synthetic receive elements.

18. The method of claim 14, wherein said transmitted signals are a simultaneous transmit and receive pulse Doppler (STAR-PD) frequency modulated waveform.

19. The method of claim 14 further comprising the step of oversampling said time-multiplexed baseband data by a predetermined factor.

20. The method of claim 14 further comprising the step of down-converting and sampling said time-interleaved data within signal received from each said receiving antenna element, and beamforming and scanning said signal by combining sampled data of said signal from each said receiving antenna element with amplitude and phase weighting.

* * * * *